United States Patent
Haynes et al.

(10) Patent No.: US 9,551,492 B2
(45) Date of Patent: Jan. 24, 2017

(54) GAS TURBINE ENGINE SYSTEM AND AN ASSOCIATED METHOD THEREOF

(71) Applicant: General Electric Company, Schenectady, NY (US)

(72) Inventors: Joel Meier Haynes, Niskayuna, NY (US); Narendra Digamber Joshi, Schenectady, NY (US); Huijuan Chen, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 1170 days.

(21) Appl. No.: 13/691,017

(22) Filed: Nov. 30, 2012

(65) Prior Publication Data

US 2014/0352321 A1    Dec. 4, 2014

(51) Int. Cl.
| | | |
|---|---|---|
| *F23R 3/28* | (2006.01) | |
| *F23R 3/34* | (2006.01) | |
| *F01D 9/02* | (2006.01) | |
| *F23R 3/46* | (2006.01) | |
| *F02K 3/00* | (2006.01) | |

(52) U.S. Cl.
CPC ............... *F23R 3/346* (2013.01); *F01D 9/023* (2013.01); *F02K 3/00* (2013.01); *F23R 3/286* (2013.01); *F23R 3/46* (2013.01); *F23R 3/34* (2013.01)

(58) Field of Classification Search
CPC ............. F23R 3/286; F23R 3/34; F23R 3/346
See application file for complete search history.

(56) References Cited

U.S. PATENT DOCUMENTS

| 4,292,801 A | 10/1981 | Wilkes et al. |
| 4,928,481 A * | 5/1990 | Joshi ................. F23R 3/346 60/737 |
| 5,080,577 A | 1/1992 | Bell et al. |

(Continued)

FOREIGN PATENT DOCUMENTS

| EP | 2028344 A1 | 2/2009 |
| EP | 2383518 A2 | 11/2011 |
| EP | 2660519 A1 | 11/2013 |

OTHER PUBLICATIONS http://cast-safety.org/pdf/3_engine_fundamentals.pdf published in Aug. 21, 2010 as verified with Wayback Machine https://archive.org/.*

(Continued)

*Primary Examiner* — Arun Goyal
(74) *Attorney, Agent, or Firm* — Ann M. Agosti (57) ABSTRACT

A gas turbine engine system includes a compressor, a combustor, and a turbine. The combustor is coupled to the compressor and disposed downstream of the compressor. The combustor includes a secondary combustor section coupled to a primary combustor section and disposed downstream of the primary combustor section. The combustor also includes a transition nozzle coupled to the secondary combustor section and disposed downstream of the secondary combustor section. The combustor further includes an injector coupled to the secondary combustor section, for injecting an air-fuel mixture to the secondary combustor section. The turbine is coupled to the combustor and disposed downstream of the transition nozzle; wherein the transition nozzle is oriented substantially tangential to the turbine.

26 Claims, 5 Drawing Sheets

(56) References Cited

U.S. PATENT DOCUMENTS

| | | | |
|---|---|---|---|
| 6,047,550 A * | 4/2000 | Beebe | F23L 7/00 60/733 |
| 6,558,154 B2 | 5/2003 | Eroglu et al. | |
| 6,868,676 B1 | 3/2005 | Haynes | |
| 7,526,912 B2 | 5/2009 | Tangirala et al. | |
| 7,721,547 B2 | 5/2010 | Bancalari et al. | |
| 7,886,539 B2 * | 2/2011 | Cai | F23R 3/346 60/732 |
| 8,082,739 B2 | 12/2011 | Chila et al. | |
| 8,176,739 B2 | 5/2012 | Evulet et al. | |
| 8,381,532 B2 * | 2/2013 | Berry | F01D 9/06 60/751 |
| 8,683,808 B2 * | 4/2014 | Venkataraman | F02C 7/228 60/39.281 |
| 8,689,559 B2 * | 4/2014 | Kraemer | F02C 7/228 60/733 |
| 2010/0095649 A1 * | 4/2010 | Blouch | F02C 7/22 60/39.463 |
| 2010/0115953 A1 | 5/2010 | Davis et al. | |
| 2011/0225973 A1 | 9/2011 | Romig et al. | |
| 2013/0174558 A1 * | 7/2013 | Stryapunin | F23R 3/286 60/734 |
| 2013/0213046 A1 * | 8/2013 | Melton | F23R 3/346 60/740 |
| 2014/0130477 A1 * | 5/2014 | Chen | F02C 3/22 60/39.463 |

OTHER PUBLICATIONS

EP Search Report and Written Opinion issued Mar. 19, 2014 in connection with corresponding EP Application No. 13194988.5.

Jaafar et al., "Reduction of Nox Emission From Gas Turbine Combustor Applying Fuel-Staged Combustion", Asean Journal of Chemical engineering, vol. 2, issue 1, Sep. 2002, pp. 61-66.

Hendricks et al., "Modeling of a Sequential Two-Stage Combustor", NASA/TM, Mar. 2005, 24 Pages.

* cited by examiner

GAS TURBINE ENGINE SYSTEM AND AN ASSOCIATED METHOD THEREOF

BACKGROUND

The primary air polluting emissions usually produced by turbines burning conventional hydrocarbon fuels are oxides of nitrogen, carbon monoxide and unburned hydrocarbons. It is well known in the art that oxidation of molecular nitrogen in air breathing engines is highly dependent upon the maximum temperature in the combustion system reaction zone and the residence time for the reactants at the maximum temperatures reached within the combustor. The level of thermal $NO_x$ formation is minimized by maintaining the reaction zone temperature below the level at which thermal $NO_x$ is formed or by maintaining an extremely short residence time at high temperature such that there is insufficient time for the $NO_x$ formation reactions to progress.

Hot combustion gas is exhausted from a combustor to a first stage vanes and blades of a turbine. In conventional systems, the use of first stage vanes to accelerate and turn gas flow presents several challenges. The vanes and associated vane support structure need high strength characteristics to withstand the forces generated in changing the direction of the hot gas flow over an angle in a relatively short distance. The temperature of gas flow and heat generated by a gas flow turning process require a cooling system. The forces and heat generated may crack the vanes and associated support structure. In such systems, the turbine firing temperature within the combustor may be affected or as such may require complex cooling requirements.

BRIEF DESCRIPTION

In accordance with one exemplary embodiment, a gas turbine engine system is disclosed. The gas turbine engine system includes a compressor, a combustor, and a turbine. The combustor is coupled to the compressor and disposed downstream of the compressor. The combustor includes a secondary combustor section coupled to a primary combustor section and disposed downstream of the primary combustor section. The combustor also includes a transition nozzle coupled to the secondary combustor section and disposed downstream of the secondary combustor section. The combustor further includes an injector coupled to the secondary combustor section, for injecting an air-fuel mixture to the secondary combustor section. The turbine is coupled to the combustor and disposed downstream of the transition nozzle; wherein the transition nozzle is oriented substantially tangential to the turbine.

In accordance with another exemplary embodiment, a method includes combusting a first air-fuel mixture in a primary combustor section and generating a first combustion gas. The method further includes feeding the first combustion gas from the primary combustor section to a secondary combustor section. The method also includes injecting a second air-fuel mixture via an injector coupled to the secondary combustor section, to combust the second air-fuel mixture and generate a second combustion gas. The method further includes injecting the first and second combustion gases via a transition nozzle substantially tangential to a turbine.

In accordance with another exemplary embodiment, a method includes forming an exemplary combustor downstream of a compressor. The combustor includes a primary combustor section; and a secondary combustor section coupled to the primary combustor section and disposed downstream of the primary combustor section. The combustor further includes a transition nozzle coupled to the secondary combustor section and disposed downstream of the secondary combustor section, such that the transition nozzle is oriented substantially tangential to a turbine. The method further includes coupling an injector to the secondary combustor section.

DRAWINGS

These and other features and aspects of embodiments of the present invention will become better understood when the following detailed description is read with reference to the accompanying drawings in which like characters represent like parts throughout the drawings, wherein.

DETAILED DESCRIPTION

In accordance with the embodiments of the present invention, a two-stage combustor for a gas turbine engine is provided with a transition nozzle. In some embodiments, the gas turbine engine includes a plurality of can combustors disposed in an annular pattern. The can combustor is provided with a transition nozzle oriented substantially tangential to an inlet of a turbine so as to introduce a swirl to the flow of combustion gas fed from the combustor to the turbine. In certain embodiments, a vane may be integrated to an exit side of the transition nozzle so as to impart some additional turning of the gas flow to the turbine. Additionally, the second stage of the combustor introduces a fuel-air mixture into the hot products fed from a first stage of the combustor. The provision of a fuel injector to the second stage of the combustor facilitates to generate a central hot zone at an exit of the transition nozzle without elevating a wall temperature of the transition nozzle. The provision of the substantially tangential oriented transition nozzle together with the fuel injector for the second stage of the combustor facilitates to increase turbine firing temperature without increasing combustor or transition nozzle cooling requirements, thereby enhancing efficiency of the gas turbine engine.

Figure 1:
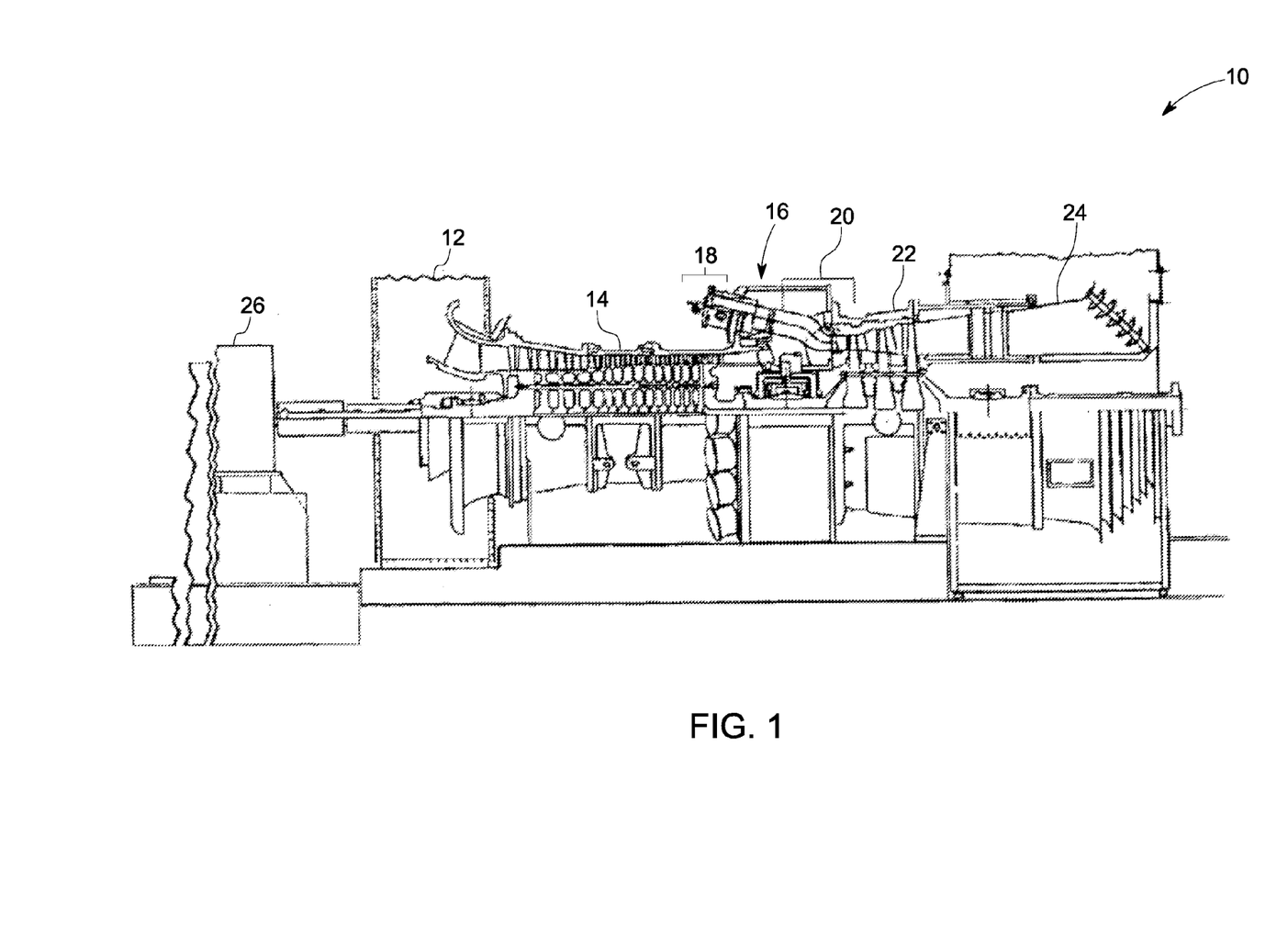
FIG. 1 is a diagrammatical representation of a gas turbine engine system in accordance with an exemplary embodiment of the present invention.

Referring now to drawings in general and FIG. 1 in particular, it will be understood that the illustrations are for the purpose of describing a preferred embodiment of the invention and are not intended to limit the invention thereto. As illustrated in FIG. 1, a gas turbine engine system, indicated generally by the numeral 10, is shown according to an exemplary embodiment of the present invention. The gas turbine engine system 10 includes an intake section 12, a compressor 14 coupled to the intake section 12 and disposed downstream from the intake section 12. The system 10 further includes a combustor 16 having a primary combustor section 18 coupled to the compressor 14 and disposed downstream from the compressor 14, and a secondary combustor section 20 disposed downstream from the primary combustor section 18. The system 10 further includes a turbine 22 coupled to the combustor 16 and disposed downstream of the secondary combustor section 20, and an exhaust section 24 coupled to the turbine 22 and disposed downstream of the turbine 22. It will be appreciated by those skilled in the art that the turbine 22 may include a plurality of turbines such as, for example, a high-pressure turbine and low-pressure turbine or a high-pressure turbine, medium-pressure turbine and low-pressure turbine. Likewise, the compressor 14 may include a plurality of compressors such as, for example, a low-pressure compressor and high-pressure compressor or a low-pressure compressor, a medium-pressure compressor and high-pressure compressor. In some embodiments, the turbine 22 may include a plurality of turbine stages, and the compressor 14 may include a plurality of compressor stages. In such embodiments, the first turbine stage may have a single rotor and the other stages may include a plurality of stators and rotors.

The turbine 22 drives the compressor 14 and a load 26 via one or more common shafts. The load 26 may be any one of an electrical generator or a mechanical drive application. Examples of such mechanical drive applications include any one of a compressor for use in oil fields or in refrigeration. The load 26 may also be a propeller as used in turbojet engines, turbofan engines, and turboprop engines.

Figure 2:
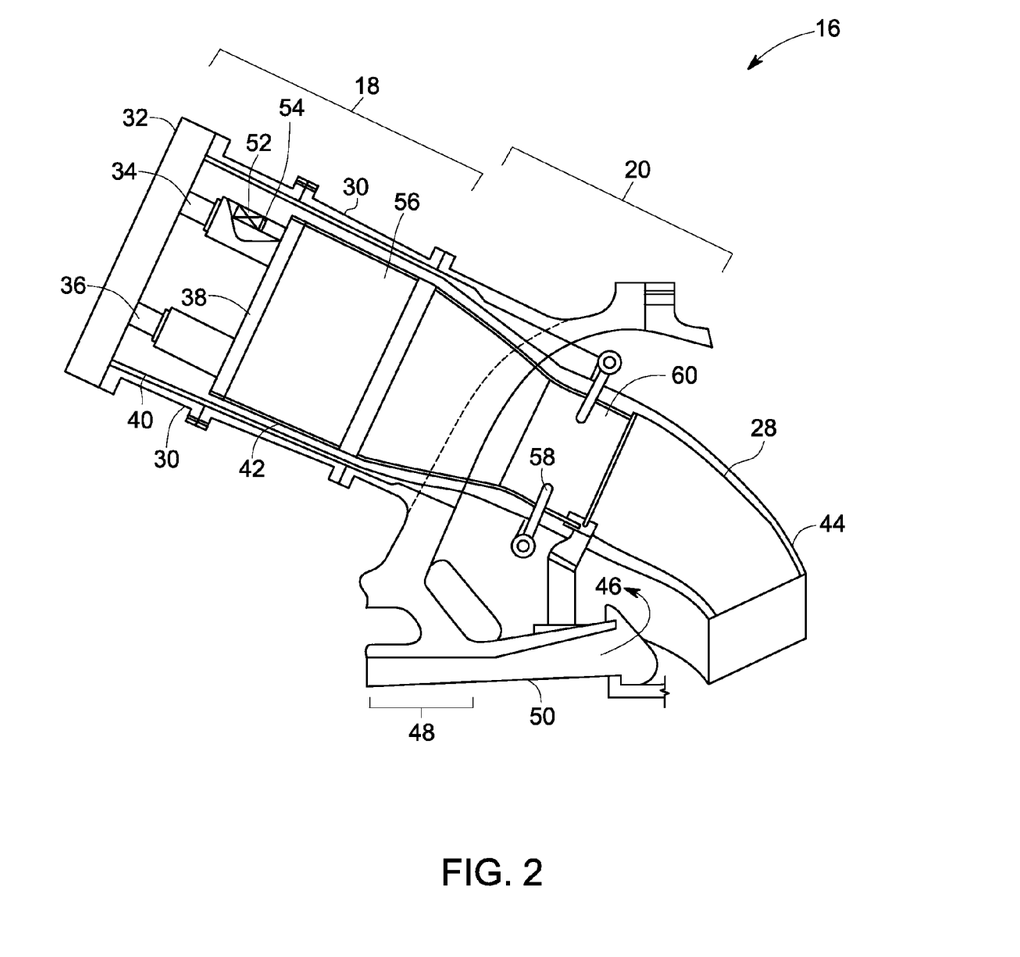
FIG. 2 is a diagrammatical representation of a combustor in accordance with another exemplary embodiment of the present invention.

Referring now to FIG. 2, a combustor 16 having a primary combustor section 18, a secondary combustor section 20, and a transition nozzle 28 for flowing hot gases of combustion to the turbine nozzles and the turbine blades (not shown) is disclosed. The primary combustor section 18 includes a casing 30, an end cover 32, a plurality of start-up fuel nozzles 34, a plurality of premixing fuel nozzles 36, a cap assembly 38, a flow sleeve 40, and a combustion liner 42 within the sleeve 40.

The combustor 16 also includes an ignition device (not shown) which preferably includes an electrically energized spark plug. Combustion in the primary combustor section 18 occurs within the combustion liner 42. Combustion air is directed within the combustion liner 42 via the flow sleeve 40. The air enters the combustion liner 42 and mixes with a fuel from the start-up fuel nozzles 34 and/or the premixing fuel nozzles 36, within the combustion liner 42. Consequently, a combustion reaction occurs within the combustion liner 42 releasing heat for the purpose of driving the turbine. High-pressure air for the primary combustor section 18 enters the flow sleeve 40 and a transition nozzle impingement sleeve 44, from an annular plenum 46. The high-pressure air is supplied by the compressor, which is represented by a series of vanes and blades 48 and a diffuser 50. Each fuel nozzle 36 includes a swirler 52 having a plurality of swirl vanes that impart rotation to the entering air and a plurality of fuel spokes 54 that distribute fuel in the rotating air stream. The fuel and air then mix in an annular passage within the premix fuel nozzle 36 before reacting within the primary reaction zone 56. In some embodiments, the air-fuel mixture (also referred to as a "first air-fuel mixture") within the primary reaction zone 56 is a lean air-fuel mixture.

In the illustrated embodiment, the secondary combustor section 20 includes an injector 58 for transversely injecting a second air-fuel mixture into a stream of first combustion products (gas) fed from the primary combustor section 18. The injector 58 may be airfoil shaped. The second air-fuel mixture may be a rich air-fuel mixture. In some embodiments, the second air-fuel mixture includes a diluent. The injector 58 that is disposed penetrating the combustion liner 42, is used to introduce additional air-fuel mixture and diluent into the secondary reaction zone 60 within the secondary combustor section 20. The air is introduced passively through the liner 42 for cooling the injector 58. The air mixes with the fuel or fuel-diluent mixture just before exiting and mixing with the primary combustion products. The hot products of combustion exiting the primary reaction zone 56 ignite the secondary fuel mixture and generate a second combustion gas to be fed to the turbine via the transition nozzle. The transition nozzle provides turning of the flow of the first and second combustion gases substantially tangential to the turbine. It should be noted herein that the term "substantially tangential" discussed herein may refer to turning the flow of the first and second combustion gases at an angle in the range of 60 degrees to 80 degrees to the turbine. The resulting secondary hydrocarbon fuel oxidation reactions go to substantial completion in the transition nozzle 28. It is preferred that the fuel-diluent mixture is well mixed prior to being injected and that the fuel-diluent are well mixed with the air prior to introduction into the secondary reaction zone 60. The hot combustion products upon exiting the turbine are exhausted via the exhaust section.

Although one combustor is shown, the gas turbine engine system includes a circular array of a plurality of circumferentially spaced combustors. The fuel/air mixture is burned in each combustor 16 to produce the hot flow of combustion gas, which is fed through the transition nozzle 28 to the turbine. In certain embodiments, the injector 58 injects the fuel mixture which may be substantially only a fuel mixture. In certain alternative embodiments, the fuel mixture may be combined with air and/or diluent. The injector 58 and the transition nozzle 28 are explained in greater detail with reference to subsequent figures. The controlling of combustion temperature and time of combustion is to, if not prevent, at least minimize $NO_x$ formation in the secondary combustor section 20. It should also be noted herein that embodiments of the present invention are equally applicable to combustion system other than annular combustion systems.

Figure 3:
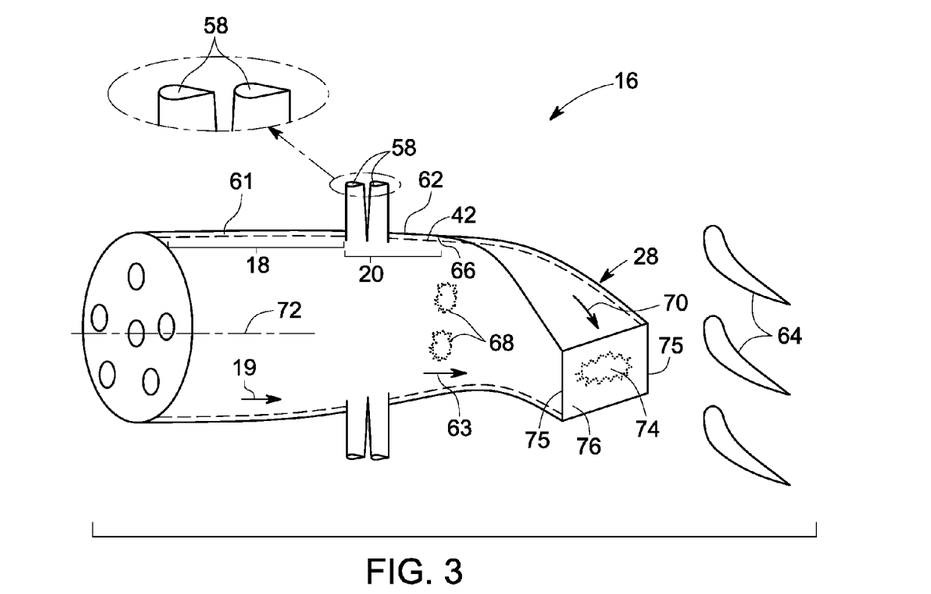
FIG. 3 is a diagrammatical representation of a combustor provided with staged fuel injection and a transition nozzle in accordance with an exemplary embodiment of the present invention.

Referring to FIG. 3, a combustor 16 provided with the injectors 58 and the transition nozzle 28, in accordance with an exemplary embodiment of the present invention is disclosed. As discussed herein, the combustor 16 includes the primary combustor section 18, the secondary combustor section 20, and the transition nozzle 28 for flowing hot gases of combustion to the turbine. The combustor 16 further includes the combustion liner 42 disposed within the primary combustor section 18, the secondary combustor section 20, and the transition nozzle 28. Cooling air may be fed via a gap 61 formed between the combustion liner 42 and the primary combustor section 18, the secondary combustor section 20, and the transition nozzle 28.

In the illustrated embodiment, a lean air-fuel mixture is combusted within the primary combustor section 18 to generate a first combust gas 19. The plurality of injectors 58 are disposed penetrating through, a periphery 62, the liner 42, and a seal of the secondary combustor section 20. The injectors 58 are used to introduce additional fuel mixture into the secondary combustor section 20. In other words, the injectors 58 are used for transversely injecting a rich air-fuel mixture into a stream of first combustion products fed from the primary combustor section 18. The hot products of combustion exiting the primary combustor section 18 ignite the secondary fuel mixture and generate a second combustion gas 63. The first and second combustion gases 19, 63 are fed to the turbine via the transition nozzle 28. In the illustrated embodiment, only the first stage blades 64 of the turbine are disclosed.

In accordance with the embodiments of the present invention, the transition nozzle 28 is oriented substantially tangential to the turbine. In the illustrated embodiment, the transition nozzle 28 is shown extending from a point 66 corresponding to a region at which a combustion flame 68 is generated in the secondary combustion section 20, and is oriented substantially tangential to the turbine. The combustion flame 68 is generated when a rich air-fuel mixture is injected into a stream of first combustion products fed from the primary combustor section 18. Specifically, in the illustrated embodiment, the transition nozzle 28 extends from the point 66 and further turning the flow toward an offset direction 70. In the illustrated embodiment, the offset direction 70 is oriented substantially tangential to the first stage blades 64 of the turbine. More specifically, a central axis 72 of the combustor 16 is oriented at a predefined angle to the turbine. In one embodiment, the central axis 72 is oriented at an angle of 45 degrees to the turbine. In other embodiments, the predefined angle may vary depending on the application. Such an orientation enables the hot combustion gas to be fed with a tangential velocity component to the first stage blades 64. The term "offset" as used herein means that the exit of the transition nozzle 28 is spaced from the inlet as measured along the direction(s) identified. For example, when the exit is described as being offset from the inlet (or relative to the inlet), the exit is spaced away from the inlet when measured in the axial direction 72. The cross-sectional area profile of the transition nozzle 28 may vary depending on the application. The provision of the injectors 58 to the secondary combustor section 20 combined with the substantially tangential orientation of the transition nozzle 28 with respect to the turbine, facilitates to confine the generation of a hot spot 74 to a center region of an exit 76 of the transition nozzle 28. It should be noted herein that the hot spot 74 is generated away from the side walls 75 of the transition nozzle 28, thereby minimizing the cooling requirements.

Figure 4:
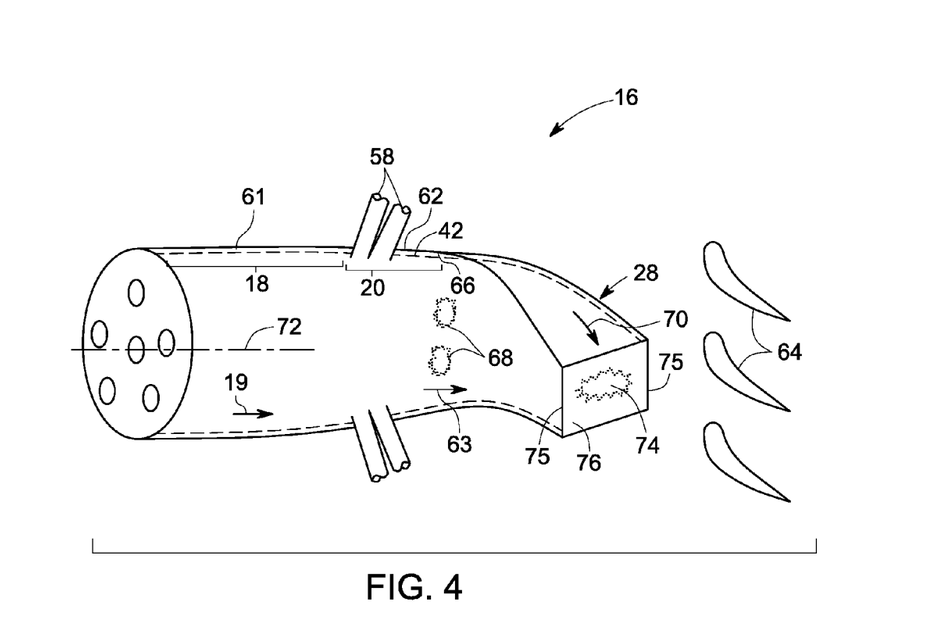
FIG. 4 is a diagrammatical representation of a combustor provided with staged fuel injection and a transition nozzle in accordance with another exemplary embodiment of the present invention.

Referring to FIG. 4, a combustor 16 provided with the injectors 58 and the transition nozzle 28, in accordance with another exemplary embodiment of the present invention is disclosed. The illustrated embodiment is similar to the embodiment of FIG. 3, except that the injectors 58 are oriented at a predefined angle with reference to the central axis 72 of the combustor 16. Such angling of the injectors 58 upstream enhances mixing of air with the fuel or fuel-diluent mixture within the limited residence time in the combustor 16.

Figure 5:
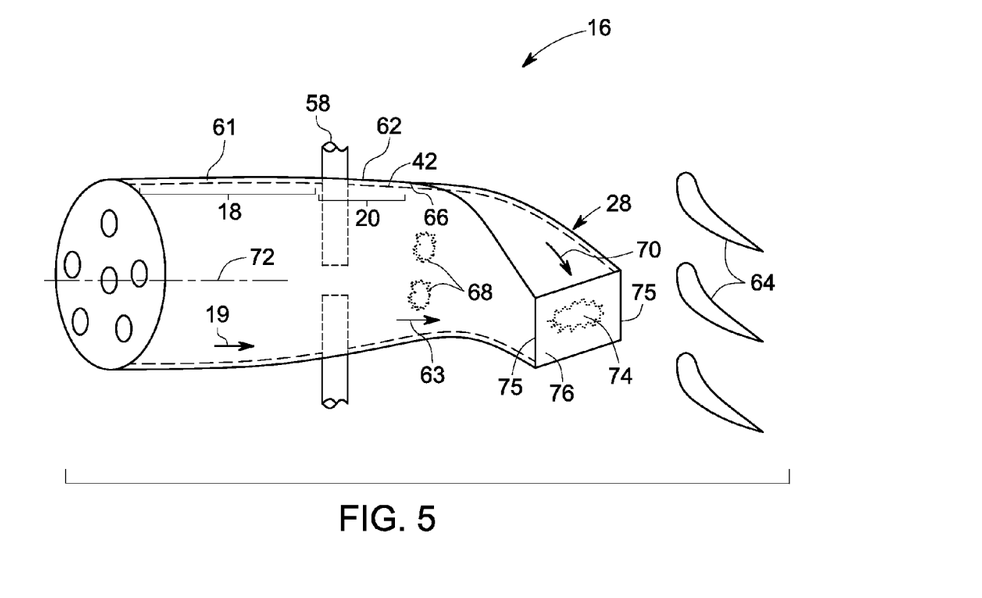
FIG. 5 is a diagrammatical representation of a combustor provided with staged fuel injection and a transition nozzle in accordance with another exemplary embodiment of the present invention.

Referring to FIG. 5, a combustor 16 provided with the injectors 58 and the transition nozzle 28, in accordance with another exemplary embodiment of the present invention is disclosed. The transition nozzle 28 also turns the combustion gas flow to introduce a tangential velocity component, to the turbine. It should be noted herein that the tangential velocity component of the gas flow is in addition to an axial velocity component and a radial velocity component. In the illustrated embodiment, the injectors 58 are the same as illustrated in the embodiment of FIG. 2, in which the injectors 58 are disposed protruding through the periphery 62, and the liner 42 into the secondary combustor section 20. Such disposing of injectors 58 facilitates better mixing of air-fuel mixture or air-fuel-diluent mixture with the primary combustion products due to ability of injectors 58 to selectively distribute air-fuel mixture or air-fuel-diluent mixture into the primary combustion products before ignition.

Figure 6:
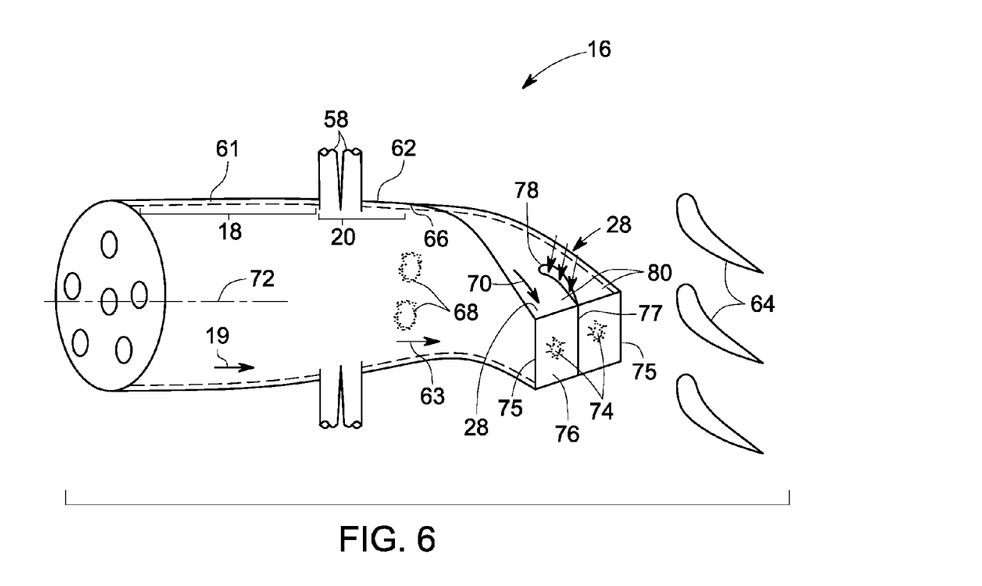
FIG. 6 is a diagrammatical representation of a combustor provided with staged fuel injection and a transition nozzle in accordance with another exemplary embodiment of the present invention.

Referring to FIG. 6, a combustor 16 provided with the injectors 58 and the transition nozzle 28, in accordance with another exemplary embodiment of the present invention is disclosed. The illustrated embodiment is similar to the embodiment of FIG. 3, and additionally includes an integrated vane 78 disposed within the transition nozzle 28 such that the transition nozzle 28 is formed into a plurality of transition sections 80. In the illustrated embodiment, the integrated vane 78 includes one or more passages for feeding cooling air into the transition nozzle 28. The generation of hot spots 74 is confined to a center region of the exit 76 of the plurality of transition sections 80 of the transition nozzle 28. It should be noted herein that the hot spot 74 is generated away from the side walls 75 of the transition nozzle 28 and a peripheral surface 77 of the vane 78, thereby minimizing the cooling requirements.

Figure 7:
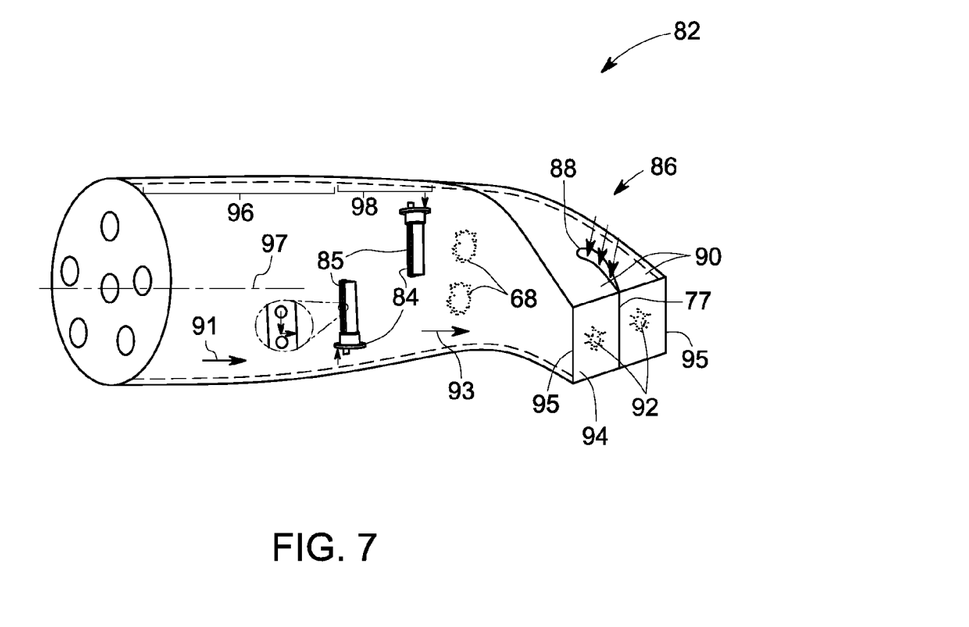
FIG. 7 is a diagrammatical representation of a combustor provided with staged fuel injection and a transition nozzle in accordance with another exemplary embodiment of the present invention.

Referring to FIG. 7, a combustor 82 provided with injectors 84 and a transition nozzle 86, in accordance with another exemplary embodiment of the present invention is disclosed. The combustor 82 has a primary combustor section 96, and a secondary combustor section 98 provided with the injectors 84. First and second combustion gases are represented by arrows 91, 93. The combustor 82 includes one or more integrated vanes 88 disposed within the transition nozzle 86 such that the transition nozzle 86 is formed into a plurality of transition sections 90. In the illustrated embodiment, the integrated vane 88 includes one or more passages for feeding cooling air into the transition nozzle 86. In some embodiments, such cooling air is fed from the compressor 14 (shown in FIG. 1). The integrated vanes 88 provide further turning of the flow of the second combustion gas substantially tangential to the turbine. The generation of hot spots 92 is confined to a center region of an exit 94 of the plurality of transition sections 90 of the transition nozzle 86. In the illustrated embodiment, the hot spots 92 are generated away from the side walls 95 of the transition nozzle 86 and a peripheral surface 99 of the vane 88, thereby minimizing the cooling requirements. The illustrated embodiment is similar to the embodiment of FIG. 2. The injectors 84 are airfoil shaped. The airfoil shape of the injectors 84 facilitates to increase the flame lift off distances and enhances the life of the injector 84. Additionally, in the illustrated embodiment, the injectors 84 have a bend portion 85 for enhanced distribution of fuel in the combustor 82. It should be noted herein that the injectors 84 discussed herein are configured to distribute the fuel non-uniformly to the secondary combustor section 20. The injectors 84 have a plurality of injection holes for distributing fuel non-uniformly. In other words, some injection holes distribute either less or more fuel to one area compared to another area in the secondary combustor section 98. The injectors 84 may be oriented perpendicular to a central axis 97 of the combustor 82. As disclosed herein, the air is introduced passively through a liner for cooling the injectors 84. The air mixes with the fuel or fuel-diluent mixture just before exiting and mixing with the primary combustion products.

Figure 8:
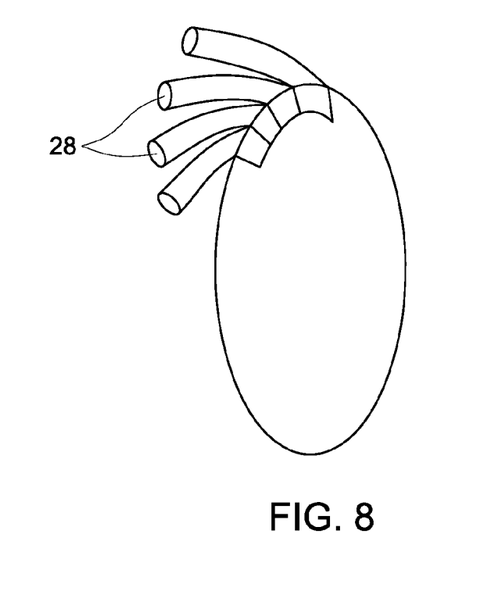
FIG. 8 is a diagrammatical representation of an array of transition nozzles disposed upstream of a turbine in accordance with an exemplary embodiment of the present invention.

Referring to FIG. 8, an annular array of transition nozzles 28 oriented substantially tangential to the turbine according to aspects of the invention. The tangential orientation of the transition nozzles 28 also facilitates to introduce a tangential velocity component to the combustion gas injected into the turbine. The number of transition nozzles 28 and their annular arrangement may be varied depending upon the application.

In accordance with the embodiments of the present invention, the combustor increases the temperature of combustion in two stages. The first stage of combustor utilizes lean pre-mixing of the air with fuel to elevate the combustion temperature to a moderate temperature for substantial burnout of carbon monoxide with low $NO_x$ production. The second stage of the combustor introduces a richer fuel-air mixture and further increases temperature of combustion products from the first stage. Further, the combustor includes the transition nozzle oriented substantially tangential to a turbine. The transition nozzle and an integrated vane may provide additional turning of the flow to increase a tangential velocity of gas flow further towards the turbine. The additional injection of air-fuel mixture in the second-stage of the combustor generates a high temperature region away from side walls of the transition nozzle and a peripheral surface of the integrated vane, at a center of an exit of each transition nozzle. Hence a surface area requiring cooling for the transition nozzle and the turbine is significantly reduced. In embodiments where the transition nozzle uses an integrated vane, at least two hot zones are formed circumferentially spaced at the exit of the transition nozzle.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A gas turbine engine system, comprising:
   a compressor,
   a combustor coupled to the compressor and disposed downstream of the compressor; wherein the combustor comprises:
      a primary combustor section;
      a secondary combustor section coupled to the primary combustor section and disposed downstream of the primary combustor section;
      a transition nozzle coupled to the secondary combustor section and disposed downstream of the secondary combustor section;
      an injector coupled to the secondary combustor section for injecting an air-fuel mixture to the secondary combustor section; and
      an inlet of a turbine coupled to the combustor and disposed downstream of the transition nozzle; wherein an exit of the transition nozzle is oriented substantially tangentially to a circumference of the inlet of the turbine.

2. The gas turbine engine system of claim 1, wherein the injector is airfoil shaped.

3. The gas turbine engine system of claim 1, wherein the injector has curved portion within the second stage combustion section for enhancing distribution of the air-fuel mixture.

4. The gas turbine engine system of claim 1, wherein the transition nozzle extends from a point corresponding to a location at which a combustion flame is generated in the secondary combustion section, towards the turbine.

5. The gas turbine system of claim 1, wherein the injector is configured to inject the air-fuel mixture non-uniformly to the secondary combustor section.

6. The gas turbine system of claim 5, wherein the injector is configured to generate a hot spot away from a plurality of side walls of the transition nozzle, and at a center portion of an exit of the transition nozzle.

7. The gas turbine engine system of claim 1, further comprising an integrated vane disposed within the transition nozzle such that the transition nozzle is formed into a plurality of transition sections.

8. The gas turbine engine system of claim 7, wherein the integrated vane is used to feed cooling air from the compressor into the transition nozzle.

9. The gas turbine system of claim 7, wherein the injector is configured to generate a hot spot away from a plurality of side walls of the transition nozzle and a peripheral surface the integrated vane, at a center portion of an exit of the transition nozzle.

10. The gas turbine system of claim 1, wherein the transition nozzle is used to inject a hot combustion gas substantially tangential to the turbine.

11. The gas turbine system of claim 1, wherein the combustor has a central axis oriented at a predefined angle to the turbine.

12. The gas turbine system of claim 1, wherein the transition nozzle provides a turning of flow of a hot combustion gas substantially tangential to the turbine.

13. A method comprising:
   combusting a first air-fuel mixture in a primary combustor section and generating a first combustion gas;
   feeding the first combustion gas from the primary combustor section to a secondary combustor section;
   injecting a second air-fuel mixture via an injector coupled to the secondary combustor section to combust the second air-fuel mixture and generate a second combustion gas; and
   injecting the first combustion gas and the second combustion gas via a transition nozzle substantially tangentially to a circumference of an inlet of a turbine.

14. The method of claim 13, wherein the first air-fuel mixture comprises a lean air-fuel mixture.

15. The method of claim 14, wherein the second air-fuel mixture comprises a rich air-fuel-diluent mixture.

16. The method of claim 13, further comprising feeding cooling air from a compressor, via an integrated vane disposed in the transition nozzle.

17. The method of claim 13, wherein injecting the second air-fuel mixture comprises injecting the second air-fuel mixture non-uniformly via the injector to the secondary combustor section.

18. The method of claim 17, further comprising generating a hot spot away from a plurality of side walls of the transition nozzle, and at a center portion of an exit of the transition nozzle.

19. The method of claim 13, wherein injecting the first combustion gas and the second combustion gas comprises providing a turning of flow of the first combustion gas and the second combustion gas substantially tangential to the turbine via the transition nozzle.

20. The method of claim 13, wherein injecting the first and second combustion gases further comprises providing a turning of flow of the first and second combustion gases substantially tangential to the turbine via an integrated vane disposed in the transition nozzle.

21. The method of claim 20, further comprising generating a hot spot away from a plurality of side walls of the transition nozzle and a peripheral surface of the integrated vane, at a center portion of an exit of the transition nozzle.

22. A method, comprising:
   forming a combustor downstream of a compressor; wherein the combustor comprises a primary combustor section; a secondary combustor section coupled to the primary combustor section and disposed downstream of the primary combustor section, and a transition nozzle coupled to the secondary combustor section and disposed downstream of the secondary combustor section, such that an exit of the transition nozzle is oriented substantially tangentially to a circumference of an inlet of a turbine; and coupling an injector to the secondary combustor section.

23. The method of claim 22, wherein the injector is airfoil shaped.

24. The method of claim 22, wherein the injector has a curved portion disposed within the secondary combustor section for enhancing distribution of an air-fuel mixture.

25. The method of claim 22, further comprising forming an integrated vane within the transition nozzle such that the transition nozzle is formed into a plurality of transition sections.

26. The method of claim 22, further comprising orienting a central axis of the combustor at a predefined angle to the turbine.

* * * * *